US012216587B2

(12) United States Patent
Zheng et al.

(10) Patent No.: US 12,216,587 B2
(45) Date of Patent: *Feb. 4, 2025

(54) PACKET CACHE SYSTEM AND METHOD

(71) Applicant: Google LLC, Mountain View, CA (US)

(72) Inventors: Jiazhen Zheng, Santa Clara, CA (US); Srinivas Vaduvatha, San Jose, CA (US); Hugh McEvoy Walsh, Los Gatos, CA (US); Prashant R. Chandra, San Jose, CA (US); Abhishek Agarwal, Santa Clara, CA (US); Weihuang Wang, Los Gatos, CA (US); Weiwei Jiang, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/583,341

(22) Filed: Feb. 21, 2024

(65) Prior Publication Data

US 2024/0193093 A1 Jun. 13, 2024

Related U.S. Application Data

(63) Continuation of application No. 17/834,018, filed on Jun. 7, 2022, now Pat. No. 11,995,000.

(51) Int. Cl.
*G06F 12/0895* (2016.01)
*G06F 12/0864* (2016.01)
*G06F 12/121* (2016.01)

(52) U.S. Cl.
CPC ...... *G06F 12/0895* (2013.01); *G06F 12/0864* (2013.01); *G06F 12/121* (2013.01)

(58) Field of Classification Search
CPC ............ G06F 12/0864; G06F 12/0866; G06F 12/0868; G06F 12/0895; G06F 12/121; G06F 12/123; G06F 12/126; G06F 2212/1016; G06F 2212/154
See application file for complete search history.

(56) References Cited

U.S. PATENT DOCUMENTS

| 6,754,662 | B1 | 6/2004 | Li |
| 9,535,848 | B2 | 1/2017 | Rowlands et al. |
| 10,397,362 | B1 | 8/2019 | Volpe et al. |
| 10,810,133 | B1 | 10/2020 | Volpe et al. |
| 2005/0198400 | A1 | 9/2005 | Minturn |

(Continued)

OTHER PUBLICATIONS

Extended European Search Report for European Patent Application No. 22207008.8 dated Jun. 12, 2023. 12 pages.

*Primary Examiner* — Aracelis Ruiz
(74) *Attorney, Agent, or Firm* — Lerner David LLP

(57) ABSTRACT

A packet cache system includes a cache memory allocator for receiving a memory address corresponding to a non-cache memory and allocated to a packet, and associating the memory address with a cache memory address; a hash table for storing the memory address and the cache memory address, with the memory address as a key and the cache memory address as a value; a cache memory for storing the packet at a location indicated by the cache memory address; and an eviction engine for determining one or more cached packets to remove from the cache memory and place in the non-cache memory when occupancy of the cache memory is high.

20 Claims, 5 Drawing Sheets

(56) References Cited

U.S. PATENT DOCUMENTS

| | | |
|---|---|---|
| 2010/0023726 A1 | 1/2010 | Aviles |
| 2011/0258391 A1 | 10/2011 | Atkisson et al. |
| 2012/0173844 A1 | 7/2012 | Punde et al. |
| 2016/0182351 A1 | 6/2016 | Wang et al. |
| 2019/0042419 A1 | 2/2019 | Tamir et al. |
| 2021/0014324 A1* | 1/2021 | Chilikin ............... G06F 3/0611 |

* cited by examiner

PACKET CACHE SYSTEM AND METHOD

CROSS-REFERENCES TO RELATED APPLICATIONS

The present application is a continuation of U.S. patent application Ser. No. 17/834,018, filed on Jun. 7, 2022, now U.S. Pat. No. 11,995,000, the disclosure of which is hereby incorporated herein by reference.

BACKGROUND

Two important attributes of packet-based communication systems are speed and reliability. In many such systems, packets may be transmitted from a node, and received at a node, faster than they can be processed. For example, in packet-based communication with an application-specific integrated circuits (ASICs) packets may be received by the ASIC faster than they can be processed, and may be transmitted by the ASIC faster than receive-acknowledgements can be received at the ASIC from the intended recipient. Accordingly, to ensure proper handling of packets at a node, the packets need to be temporarily stored while they await processing. For instance, packets transmitted by an ASIC need to be stored at the ASIC until receipt is acknowledged. Further, in order to maximize the speed at which a node operates, temporarily stored packets should be stored in cache memory whenever possible.

BRIEF SUMMARY

It has been recognized that achieving high-level communication performance at a node of a packet-based communication system, even under drop and congestion scenarios, requires efficient storage support for a large number of outstanding packets where each request could be as large as Maximum Transmission Unit (MTU) size. In view of the desire for efficient packet storage support, the presently disclosed technology is provided.

In accordance with the presently disclosed technology a packet cache configuration provides efficient data management for spillover from cache memory to non-cache memory (e.g., on-chip SRAM to off-chip DRAM), and provides a transparent interface to the user independent of the data storage location (e.g., on-chip or off-chip).

In one aspect, the technology provides a packet cache system including a cache memory allocator for receiving a memory address corresponding to a non-cache memory and allocated to a packet, and associating the memory address with a cache memory address; a hash table for storing the memory address and the cache memory address, with the memory address as a key and the cache memory address as a value; a cache memory for storing the packet at a location indicated by the cache memory address; and an eviction engine for determining one or more cached packets to remove from the cache memory and place in the non-cache memory when occupancy of the cache memory is high.

In another aspect, the technology provides a method for storing packets in a cache memory of a device, including allocating a memory address, corresponding to a non-cache memory, to a packet; associating the memory address with a cache memory address; storing the memory address and the cache memory address in a hash table, with the memory address as a key and the cache memory address as a value; storing the packet in cache memory at a location indicated by the cache memory address; and when occupancy of the cache memory is high, determining one or more cached packets to remove from the cache memory and place in the non-cache memory.

BRIEF DESCRIPTION OF THE DRAWINGS

The accompanying drawings are not intended to be drawn to scale. Also, for purposes of clarity not every component may be labeled in every drawing. In the drawings.

DETAILED DESCRIPTION

Examples of systems and methods are described herein. It should be understood that the words "example," "exemplary" and "illustrative" are used herein to mean "serving as an example, instance, or illustration." Any embodiment or feature described herein as being an "example," "exemplary" or "illustration" is not necessarily to be construed as preferred or advantageous over other embodiments or features. In the following description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Figure 1:
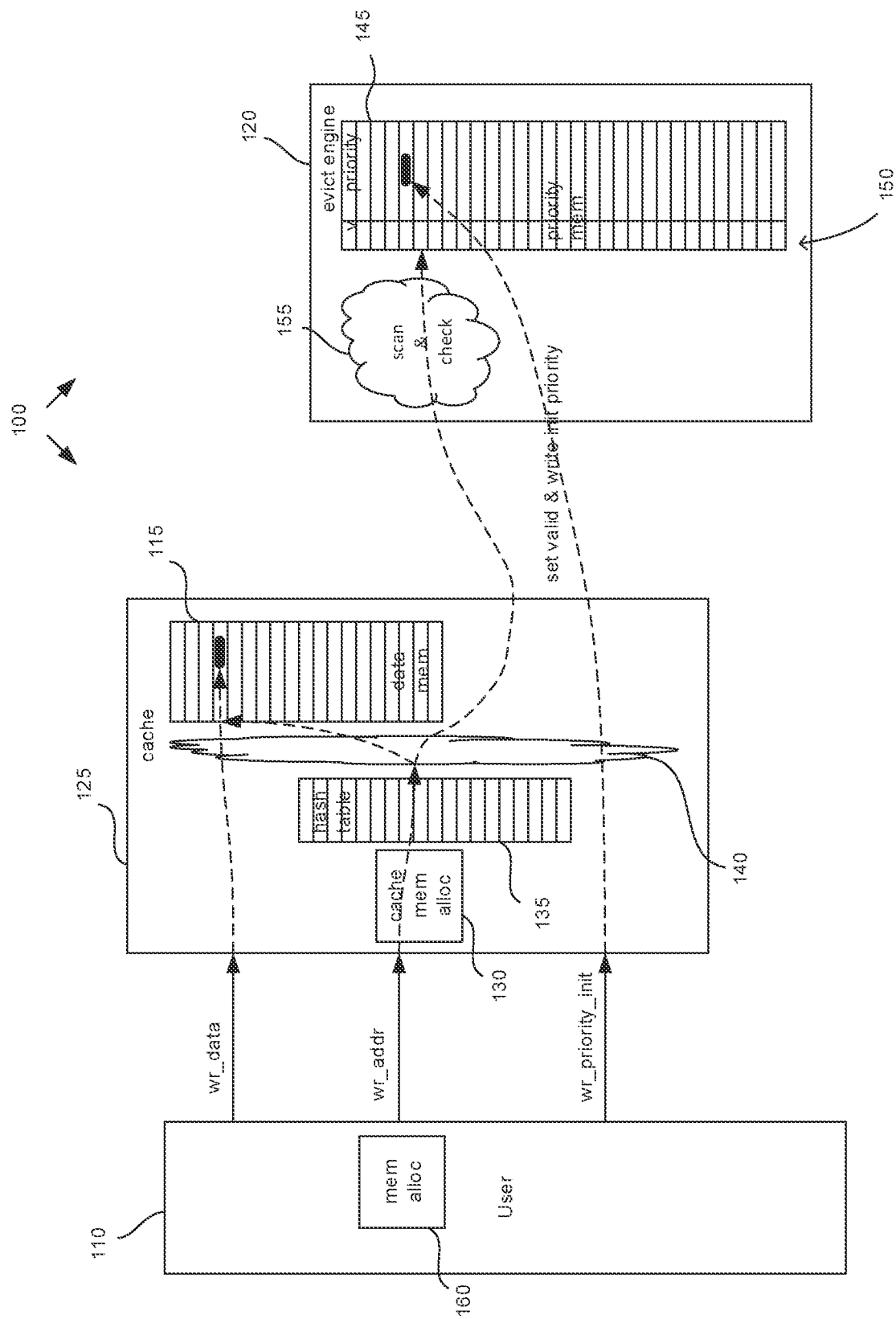
FIG. 1 is a block diagram of a packet cache system and a packet cache system user according to an embodiment, in which the flow of write information is depicted.

FIG. 1 is a block diagram of a packet cache system 100 and a packet cache system user 110 according to an embodiment, in which the flow of write information is depicted. The system hardware is optimized when packets stored in the system are handled in one or more fixed size units, and thus the system 100 is described in the context of packets being divided into 256 byte units called cells. The system 100 stores and manages cells for packets received in both a cache memory 115 (e.g., an on-chip static random-access memory, SRAM) and a non-cache memory (not shown) (e.g., off-chip dynamic random-access memory, DRAM) based on occupancy of the cache memory 115 and other parameters. The system 100 manages the eviction of cells from the cache memory 115 to the non-cache memory, and read/write transactions from the user 110 are handled transparently from the perspective of the user 110, irrespective of whether the data being read/written is stored in the cache memory 115 or the non-cache memory. Moreover, in some embodiments, the system 100 stores data in the cache memory 115 in 64B flits (flow control units/flow control digits).

The packet cache system 100 may include an eviction engine 120 to move data from the cache memory 115 to non-cache memory based on occupancy of the cache memory 115 and packet priority. The eviction engine 120 may also use the age of cache memory 115 entries as a factor in determining whether a packet may be evicted. The eviction engine 120 attempts to ensure that the cache memory 115 has space to accommodate write requests from user 110. In rare cases that eviction is not fast enough to accommodate write requests, the write request interface will be back-pressured.

The packet cache system 100 of FIG. 1 has a cache subsystem 125. The cache subsystem 125 includes a cache memory allocator 130 for receiving a memory address corresponding to a non-cache memory and allocated to a packet, and a hash table 135 for associating the memory address with a cache memory address corresponding to a location in the cache memory 115. The packet, or part of the packet, may be stored in the cache memory 115 at a location indicated by the cache memory address. The memory address may be hashed to hash table location in the hash table 135 by applying a hash function to the memory address, and the cache memory address may be stored in the hash table 135 at the hash table location. In this manner, one may rapidly search out the packet from the cache memory 115 based on the memory address of the packet (e.g., in response to a read request) by hashing the memory address to a location in the hash table 135, noting the cache memory address from the location in the hash table 135, and accessing the cache memory 115 based on the noted address. Operations within the cache subsystem 125 may be controlled according to a finite state machine (FSM) 140.

In some embodiments, both the memory address and the cache memory address for a packet or cell data may be stored at a location in the hash table 135 as a "key-value pair." Such configuration facilitates use of the memory address (or key) to locate the cache memory address(es) of a desired packet when the hash table 135 is used to store multiple cache memory addresses at each location of the hash table 135.

In embodiments employing 256B cells and 64B flits, the cache memory 115 may be organized in four banks, and the cache memory allocator 130 may allocate a branch of memory addresses according to the length of write data, at a rate of up to four addresses per cycle.

In any event, each packet in the cache memory 115 may correspond on a one-to-one basis with a priority memory entry in a priority memory 145 of the eviction engine 120. When a packet or cell is assigned a cache memory address in cache memory 115 and is stored in the cache memory 115 at the cache memory address, the packet or cell is assigned a corresponding priority memory address in the priority memory 145 and a priority for the packet or cell is stored at the corresponding priority memory address. A valid/invalid indicator (e.g., a valid/invalid bit) is stored with the priority, as indicated by a validity section 150 of the priority memory 145. The eviction engine 120 uses eviction logic 155 to initiate and conduct an evict scan, when occupancy of the cache memory 115 is high, although an evict scan can also be triggered by the user 110 through an evict interface (not shown). When a packet or cell is evicted/deallocated from the cache memory 115, its corresponding valid/invalid indicator is set to invalid.

The FIG. 1 embodiment further includes a memory allocator 160 for allocating non-cache memory addresses to packets. The memory allocator 160 is shown as part of the user 110; however, it should be noted that in some embodiments the memory allocator 160 may be part of the packet cache system 100.

The packet cache system 100 supports the following features:
- Store data in the cache memory 115 (e.g., SRAM on-chip memory) in flits of 64B.
- Work with the eviction engine 120 to move data from cache memory 115 to non-cache memory (e.g., DRAM off-chip memory), based on cache occupancy and packet priority.
- Interface for Write, Read, Deallocation, and Eviction on a packet basis.
    - Accept write data cells for each packet and track cells that belong to a packet.
    - Eviction is also managed on a packet basis and all cells for a given packet reside either in cache memory 115 or in non-cache memory
    - Upon one read request with the non-cache memory address pointing to a control cell, the packet cache system 100 reads back all data cells for the packet.
    - Upon one deallocation request with the non-cache memory address pointing to the control cell, the packet cache system 100 deallocates all data cells for the packet.
- Re-order read data cells per packet/per connection.
- The cache subsystem 125 is fully associative and uses the hash table 135 for lookup.
- Write back policy which ensures that the non-cache memory bandwidth is conserved. Data is written back to non-cache memory only when a packet is evicted from the cache memory 115.

Regarding the dividing of packets into cells, each cell may be associated with a non-cache memory address (e.g., a DRAM address). Each cell may include 256B. Further, each cell may be in one of 3 formats:
- Control cell with inline payload—having the following components:
    - Packet info
    - Packet Meta Data (PMD) to be sent to Upper Level Protocol (ULP)
    - Packet data
- Control cell with payload pointers—having the following components:
    - Packet info
    - PMD to be sent to ULP
    - Packet data pointers to all cells' non-cache memory addresses
- Data cell—has only a single component:
    - Packet data If a packet can fit into one cell, the packet will fit in one control cell with inline payload. If a packet cannot fit into one cell, the packet will use a first cell as a control cell with payload pointers, and packet data will be stored in data cells.

In general, a packet is subjected to a write, read, deallocate process. For example, a packet received by user 110 is written to cache memory 115 while the packet awaits processing, then during processing the packet is read from the cache memory 115 multiple times, and when the processing for the packet is complete the space in the cache memory 115 that was allocated to the packet is deallocated.

The write process contains the following steps:
- User 110, e.g., a transmit/receive (TX/RX) module of an ASIC, generates the write request, including:
    - Assemble data in required format For each cell of the assembled data, send a free address for non-cache memory space (for purposes of this description, these addresses will be called dram_cell_addr)

Set initial priority level for current packet

Set start-of-packet/end-of-packet (sop/eop) indicators to demarcate the packet within the write request The cache subsystem 125 will assemble the packet into write data (wr_data) of fixed-size cells and store these cells in the cache memory 115:

Get available cache memory addresses from the cache memory allocator 130 (call these addresses cache_addr)

For each cell of the assembled write data, install the hash table 135 with dram_cell_addr as key and cache_addr as value Store cells to the cache memory 115 at cache_addr If sop is set and this is the first flit, send an install request to the eviction engine 120 with initial priority level for the packet (sop will be set for the 1st cell of a packet; e.g., a large packet might be broken down to several cells, among which the first cell has sop=1 and last cell has eop=1)

Send back write response to user—if a write is successful the cache subsystem 125 sends the user 110 a write response indicating that the write is successful; if there is not enough space in cache memory 115 to accommodate the write request, the cache subsystem 125 back-pressures the user 110 to indicate that the write request cannot be accommodated (cache subsystem 125 may resume to accept writes to the cache memory once space is available due to deallocate/evict)

The read process contains the following steps:

User 110, e.g., a transmit/receive (TX/RX) module of an ASIC, generates the read request, including:

Send first data cell's address which is previously assigned by memory allocator 160 during write (called as dram_cell_addr) to cache subsystem 125

Provide expected data length to cache subsystem 125

The cache subsystem 125 will assemble the read data (rd_data) properly according to read interface requirements and return all read data for read requests in the order in which the read requests are received at the cache subsystem (It is noted that there could be multiple connections and each connection will have multiple packets to be read; and that within the same connection, the read responses are in the order in which the read requests are received, but between different connections, the read response might be out of order):

Store read requests and cookies in a reorder buffer (ROB)

Do a hash table lookup in hash table 135 for the first data cell's dram_cell_addr If hit Read the corresponding entry from cache memory 115 according to cache memory addresses returned from with hash table 135 and link the read entry to the corresponding ROB request (The reorder buffer entry is packet based; the response might contain multiple cells, but all the cells should belong to one packet)

Figure 2:
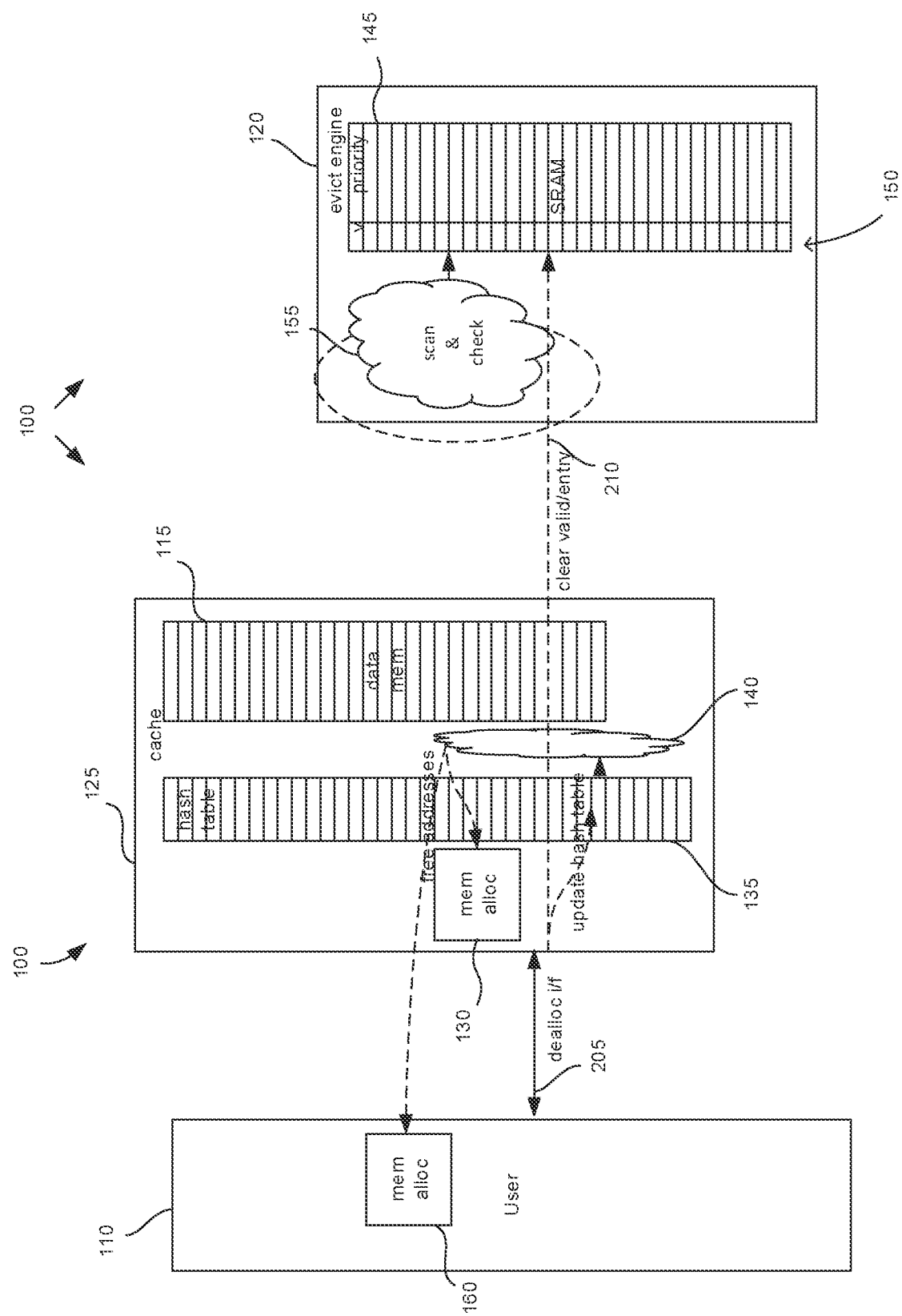
FIG. 2 is a block diagram of the packet cache system and the packet cache system user of FIG. 1, in which the flow of deallocation information is depicted.

If the expected data length is no more than 1 cell long, mark the corresponding ROB request as done; if the expected data length is more than 1 cell long, decode the first cell, get the data pointers for the dram_cell_addr of other cells Repeat the hash table lookup/cache memory read process until all data pointers are read out from data memory, then mark the read done in the ROB If miss Read the corresponding entry from non-cache memory and link the read entry to the corresponding ROB request If the expected data length is no more than 1 cell long, mark the corresponding ROB request as done; if the expected data length is more than 1 cell long, decode the first cell, get the data pointers for the dram_cell_addr addresses of other cells Read data from non-cache memory according to the dram_cell_addr addresses of the other cells, then mark the read done in the ROB Based on the ROB, send to the user 110 the read data for the oldest read request pertaining to the same connection as the current read request when the current read is done; or, if there is no older read request pertaining to the same connection as the current read request, send to the user 110 the read data for the current read request as soon as the current read is done Turning now to FIG. 2, the figure is a block diagram of the packet cache system 100 and the packet cache system user 110 of FIG. 1, in which the flow of deallocation information is depicted.

The deallocate process contains the following steps:

User 110, e.g., a transmit/receive (TX/RX) module of an ASIC, generates a deallocate request corresponding to a packet to the cache subsystem 125 through a deallocation interface 205, including:

send first data cell's address which is previously assigned by the memory allocator 160 during write (dram_cell_addr)

provide expected data length

The cache subsystem 125 will deallocate memory space allocated to the packet and respond to the user according to deallocate interface 205 requirements:

Do a lookup in hash table 135 for the first cell's dram_cell_addr

If hit

Read out the 1st data cell from cache memory 115

If there is more than one cell, get the data pointers for the other cell(s) and do a lookup in hash table 135 for each additional cell to get the corresponding cache memory addresses For all above lookups Return the cache memory address to cache memory allocator 130 as an available cache memory address so that the cache memory allocator 130 can re-use the cache memory address Return non-cache memory address to the memory allocator 160 so that the memory allocator 160 can re-use the non-cache memory addresses Update the hash table 135, i.e., removing the entry corresponding to the deallocated cache memory address Generate an uninstall request 210 to the eviction engine 120 so that the eviction engine 120 can mark as invalid the entry in priority memory 145 that corresponds to the deallocated cache memory address If miss
    Read out the 1st data cell from non-cache memory
    If more than one cell, get the data pointers for other cell(s), and
        For all non-cache memory addresses, either one address corresponding to the 1st cell or to multiple addresses corresponding to the 1st cell and one or more other cells, return the addresses to the memory allocator 160 so that the memory allocator can re-use the addresses Regarding eviction, no matter how many cells one packet has, all cells will be evicted together. Thus, all cells for a packet will be either in the cache memory 115 or in the non-cache memory.

Figure 3:
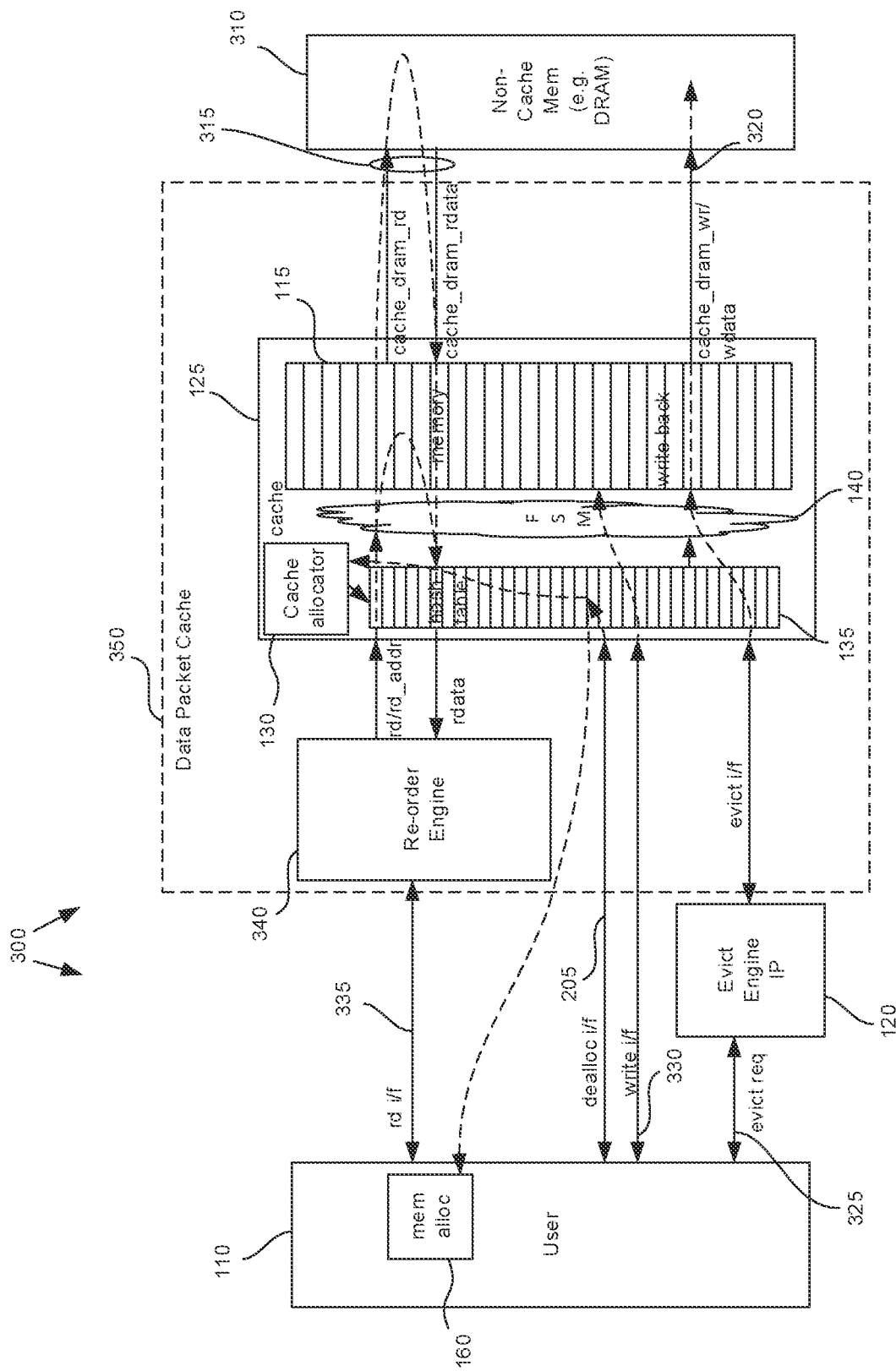
FIG. 3 is a block diagram of a packet cache system, a packet cache system user, and a non-cache memory according to an embodiment.

The evict process contains the following steps:
The eviction engine 120 determines which packet to be evicted and assembles the evict request, including:
    Eviction engine 120 will initiate an evict scan according to the eviction logic 155 when occupancy of the cache memory 115 is high; the eviction engine 120 will determine which packet to be evicted from the cache memory 115 to non-cache memory according to an eviction engine evict mechanism
    Eviction can also be triggered directly by the user 110 request through an evict interface between the user and the eviction engine 120
    Once a packet is selected for eviction, the eviction engine 120 will send the non-cache memory address for the first cell of the packet to the cache subsystem 125
The cache subsystem 125 will evict the entire packet:
    Do a lookup in the hash table 135 for the non-cache memory address of the first cell
    If hit
        Read out the 1st data cell from cache memory 115
        If there is more than one cell, get the data pointers for the other cell(s) and do a lookup in hash table 135 for each additional cell to get the corresponding cache memory addresses
        For all above lookups
            Return the cache memory address to cache memory allocator 130 as an available cache memory address so that the cache memory allocator 130 can re-use the cache memory address
            read out the data from the cache memory address and write the data to the non-cache memory address:
            Reformat data and address according to the requirements of the non-cache memory interface
            Update the hash table 135 to remove the entry corresponding to the cache memory address of the evicted cell
    If miss
        miss means a racing case exists, i.e., the space in cache memory 115 corresponding to the packet designated for eviction was deallocated just before the eviction of the packet; so, the eviction process can be marked as done in response to the miss Turning now to FIG. 3, the figure is a block diagram of a packet cache system 300, the packet cache system user 110, and a non-cache memory 310 according to an embodiment. As can be seen from the FIG. 3, the packet cache system 300 has six interfaces, a non-cache memory read interface 315, a non-cache memory write interface 320, an evict request interface 325, a write interface 330, the deallocation interface 205, and a read interface 335. The read interface couples the user 110 to a reorder engine 340 which, in turn, may include and maintain the ROB. The reorder engine 340 serves to reorder read responses from the cache memory 115 and non-cache memory 310, as necessary. The reorder engine 340 and cache subsystem 125 define a data packet cache 350.

In some embodiments, the data packet cache 350, the evict engine 120 and the user 110 are parts of a single integrated circuit chip, and the non-cache memory 310 is external to the chip. For example, the data packet cache 350, the evict engine 120 and the user 110 are part of an ASIC, with the user 110 being a TX/RX module of the ASIC, the cache memory being SRAM internal to the chip, and the non-cache memory 310 being DRAM external to the chip. In such embodiments, the data packet cache 350 includes the cache memory 115 to store packets on-chip, the cache memory allocator 130 to allocate available space in cache memory 115 when a write event happens, the reorder engine 340 to reorder read responses from either cache memory 115 or non-cache memory 310, the hash table 135 to remember the mapping between non-cache memory addresses and cache memory addresses, and the finite state machine 140 to manage all the flows.

The user 110 will initiate read, write, deallocate events to the data packet cache 350, while the eviction engine 120 handles priority/age based evictions.

Regarding the reorder engine 340, it will record the order of all read requests and return all read responses in the same order, no matter whether the data is from the cache memory 115 or the non-cache memory 310.

Figure 4:
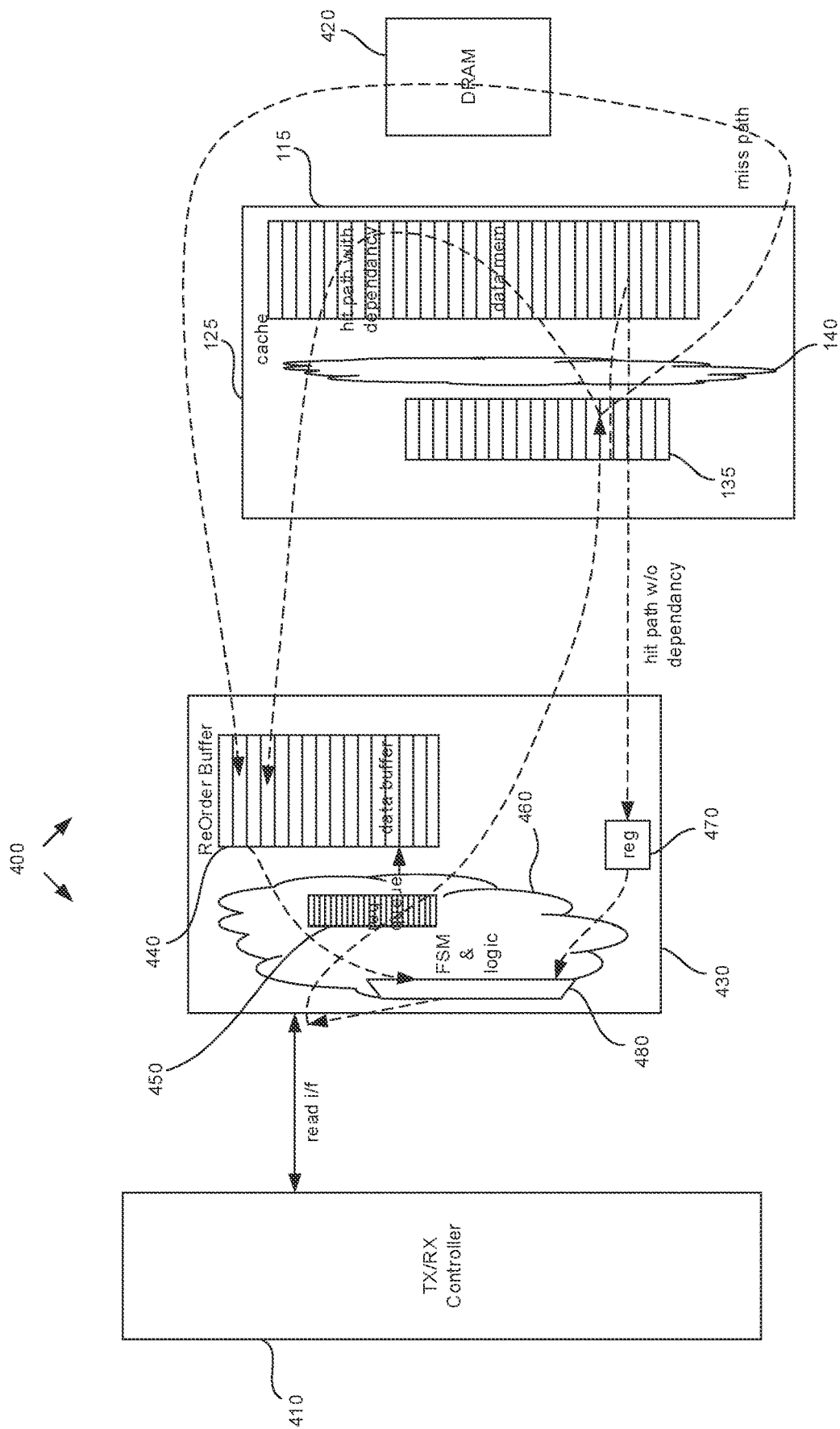
FIG. 4 is a block diagram of a packet cache system, a packet cache system user, and a non-cache memory according to an embodiment, in which elements of a reorder engine embodiment are depicted.

FIG. 4 is a block diagram of a packet cache system 400, a TX/RX controller 410, and DRAM 420 according to an embodiment, in which elements of a reorder engine 430 are depicted. In the FIG. 4 configuration, the TX/RX 410 is a packet cache system user, and the DRAM 420 is a non-cache memory As can be seen from FIG. 4:

When a read request is sent from the TX/RX controller 410 to the packet cache system 400, a reorder buffer (ROB) 440 of the reorder engine 430 will assign a continuous data buffer space for that read request according to its length. The start and end addresses of the data buffer for the read request (all buffer addresses for the read request are collectively referred to as buffer_addr) are stored in a request array 450 of the reorder engine 430.

The request array 450 will store other read information as well, such as dram_cell_addr for the first cell (or only cell) of a packet being read, the length of the packet being read, and cookie bits for the packet being read (e.g., data tags).

The request array 450 will also keep track of how many data cells are ready so that a reorder buffer FSM 460 can easily check if the head packet is able to be shipped out.

The start and end buffer_addr are passed to the cache subsystem 125 with dram_cell_addr for the first cell (or only cell) of a packet being read.

If a lookup of the dram_cell_addr in the hash table 135 results in a hit
    data will be read out from cache memory 115, and then returned to the reorder buffer 440 with its corresponding buffer_addr as tag.
    data will be stored in the reorder buffer 440 at the buffer_addr.

If a lookup of the dram_cell_addr in the hash table 135 results in a miss

Cache subsystem 125 will send read request to DRAM 420 with cookie bits set as buffer_addr.

When data comes back from DRAM 420, the cookie bits are returned as well. So, we can use the pre-assigned buffer_addr to store the data returned from the DRAM 420 in the reorder buffer.

The reorder buffer FSM 460 will continuously check if all data cells for the head request are available. If yes, reorder buffer FSM 460 will send data to the TX/RX controller 410 on the read response interface.

After all data for a requested packet is sent out, the corresponding entry in the request array 450 is cleared, the read pointer for the request array 450 is moved to the next request array entry, and the space in the reorder buffer 440 that was allocated to the sent packet is available for reuse.

It should be noted that there are instances for which data corresponding to a read request does not need to be stored in the reorder buffer 440. To accommodate such instances, the reorder engine 430 may include a register 470. The register 470 is used to store data read prior to such data being sent from the reorder engine 430 to the TX/RX controller 410. Further, the reorder engine FSM 460 may include a multiplexer function 480 for switching between supplying data from the reorder buffer 440 and the register 470.

Figure 5:
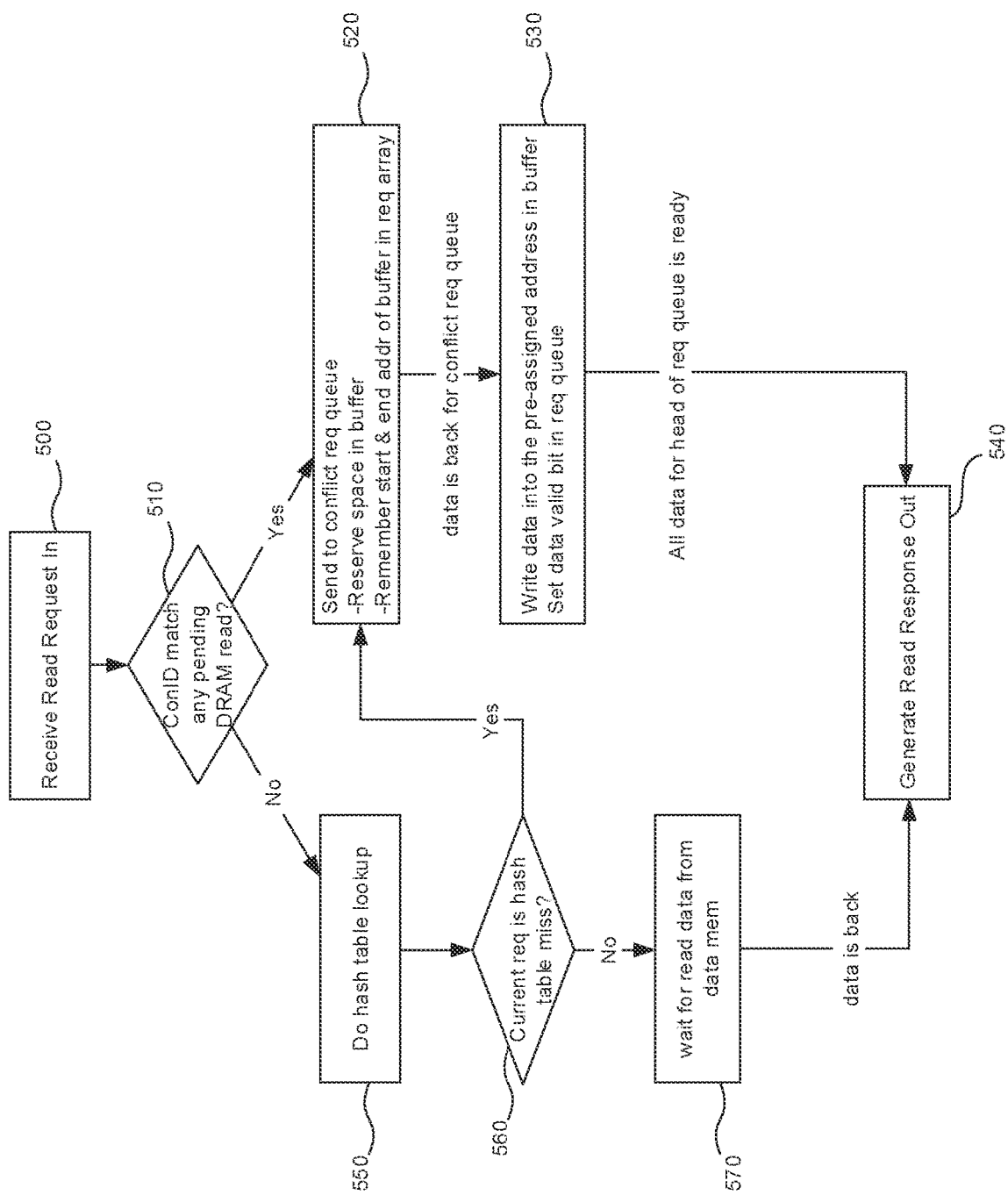
FIG. 5 is a flowchart describing the handling of a user read request according to a reorder engine of an embodiment.

Turning now to FIG. 5 the figure is a flowchart describing operation of the reorder engine 430 according to an embodiment. FIG. 5 is described in reference to the FIG. 4 configuration. As can be seen from FIG. 5, when the reorder engine 430 receives a read request (step 500), a determination is made as to whether the received read request corresponds to a connection ID that matches the connection ID of a pending read request for which DRAM 420 is being read (step 510). If the received read request corresponds to a connection ID that matches the connection ID of a pending DRAM read request, then there is a possibility that the data for received read request and the data for the pending read request will be available out of order; and therefore the received read request is sent to the request array 450 of the reorder engine 430 for handling (step 520), and the reorder engine 430 will reorder the out-of-order responses to make sure TX/RX controller 410 sees the read responses for same connection in order. When the received read request is in the request array 450, data pertaining to the request is read and from the DRAM 420 and placed in the reorder buffer 440, and when all the data for the received request is in the reorder buffer 440 a valid bit for the received request is set in the request array 450 (step 530). Following receipt of all the data by the reorder buffer 440 and setting of the valid bit, the reorder engine 430 may send the data for the received read request to the TX/RX controller 410 (step 540).

If, in step 510, it is determined that the received read request does not correspond to a connection ID that matches the connection ID of a pending read request for which DRAM 420 is being read, then a lookup is performed in the hash table 135 for the dram_cell_addr of the first cell (or only cell) for the received read request (step 550), and a determination is made as to whether or not the lookup results in a hash table miss (step 560). If the lookup results in a hash table miss, the operation proceeds to step 520, with the received read request being sent to the request array 450 for handling so as to avoid the data for the read request being provided to the TX/RX controller out of order (e.g., due to slow speed of retrieval of the data from DRAM 420).

If the lookup of step 550 results in a hash table hit, the data corresponding to the received read request is read from the cache memory 115 and stored in the register 470, without the read request being sent to the request array 450 (step 570). Following receipt of all the data by the register 470, the reorder engine 430 sends the data for the received read request to the TX/RX controller 410 (step 540).

Embodiments of the present technology include, but are not restricted to, the following.

(1) A packet cache system including a cache memory allocator for receiving a memory address corresponding to a non-cache memory and allocated to a packet, and associating the memory address with a cache memory address; a hash table for storing the memory address and the cache memory address, with the memory address as a key and the cache memory address as a value; a cache memory for storing the packet at a location indicated by the cache memory address; and an eviction engine for determining one or more cached packets to remove from the cache memory and place in the non-cache memory when occupancy of the cache memory is high.

(2) The system according to (1), further including a memory allocator for assigning the memory address to the packet.

(3) The system according to (2), wherein the memory allocator is operable to form the packet into one or more cells, the one or more cells including a control cell when the packet is formed into one cell, and including a control cell and one or more data cells when the packet is formed into more than one cell, wherein the memory allocator assigns the memory address to the control cell, and respectively assigns one or more additional memory addresses to the one or more data cells.

(4) The system according to (3), wherein when the packet is formed as more than one cell the control cell includes one or more pointers to respective ones of the additional memory addresses.

(5) The system according to (3), wherein when the packet is formed as more than one cell the cache memory allocator is operable to receive the one or more additional memory addresses and associate the one or more additional memory addresses with respective one or more additional cache memory addresses.

(6) The system according to (5), wherein the hash table is operable to store the additional memory addresses and the additional cache memory addresses, with the additional memory addresses as keys and the additional cache memory addresses as respective values.

(7) The system according to (5), wherein the cache memory is operable to store a portion of the packet at the location indicated by the cache memory address, and to store respective other portions of the packet at respective locations indicated by the additional cache memory addresses.

(8) The system according to (1), wherein the eviction engine includes a memory for storing a priority for each packet stored in the cache memory.

(9) The system according to (1), wherein the system is an integral part of an integrated circuit.

(10) The system according to (9), wherein the integrated circuit is an application-specific integrated circuit (ASIC).

(11) The system according to (9), wherein the cache memory is an integral part of the integrated circuit, and the non-cache memory is external to the integrated circuit.

(12) The system according to (11), wherein the cache memory is a static random-access memory (SRAM), and the non-cache memory is a dynamic random-access memory (DRAM).

(13) The system according to (1), further including a reorder engine for receiving a read request including a read address corresponding to the non-cache memory and allocated to a desired packet to be read from either the cache memory or the non-cache memory, and for storing the desired packet, upon reading from either the cache memory or the non-cache memory, into a reorder buffer such that the desired packet is supplied in response to the read request at a timing proper relative to a timing of other read requests.

(14) The system according to (13), wherein the reorder engine is operable, upon receiving the read request, to assign a continuous space in the reorder buffer for accommodating the desired packet.

(15) A method for storing packets in a cache memory of a device, including allocating a memory address, corresponding to a non-cache memory, to a packet; associating the memory address with a cache memory address; storing the memory address and the cache memory address in a hash table, with the memory address as a key and the cache memory address as a value; storing the packet in cache memory at a location indicated by the cache memory address; and when occupancy of the cache memory is high, determining one or more cached packets to remove from the cache memory and place in the non-cache memory.

(16) The method according to (15), wherein the step of allocating a memory address includes forming the packet into one or more cells, the one or more cells including a control cell when the packet is formed into one cell, and including a control cell and one or more data cells when the packet is formed into more than one cell; and allocating the memory address to the control cell, and respectively allocating one or more additional memory addresses to the one or more data cells.

(17) The method according to (16), wherein when the packet is formed as more than one cell the control cell includes one or more pointers to respective ones of the additional memory addresses.

(18) The method according to (16), wherein when the packet is formed as more than one cell the method further includes associating the one or more additional memory addresses with respective one or more additional cache memory addresses.

(19) The method according to (18), wherein the step of storing the memory address and the cache memory address in a hash table further includes storing the additional memory addresses and the additional cache memory addresses in the hash table, with the additional memory addresses as keys and the additional cache memory addresses as respective values.

(20) The method according to (19), wherein the step of storing the packet in cache memory at a location includes storing a portion of the packet at the location indicated by the cache memory address, and storing respective other portions of the packet at respective locations indicated by the additional cache memory addresses.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims.

The invention claimed is:

1. A packet cache system comprising:
a cache memory allocator for receiving a memory address corresponding to a non-cache memory and allocated to a packet, and associating the memory address with a cache memory address;
a hash table for storing the memory address and the cache memory address, with the memory address as a key and the cache memory address as a value;
a cache memory for storing the packet at a location indicated by the cache memory address;
an eviction engine for determining one or more cached packets to remove from the cache memory and place in the non-cache memory when occupancy of the cache memory is high; and
a reorder engine for receiving a read request comprising a read address corresponding to the non-cache memory and allocated to a desired packet to be read from either the cache memory or the non-cache memory, and for storing the desired packet, upon reading from either the cache memory or the non-cache memory, into a reorder buffer such that the desired packet is supplied in response to the read request at a timing proper relative to a timing of other read requests.

2. The system according to claim 1, wherein the reorder engine is operable, upon receiving the read request, to assign a continuous space in the reorder buffer for accommodating the desired packet.

3. The system according to claim 1, further comprising a memory allocator for assigning the memory address to the packet.

4. The system according to claim 3, wherein the memory allocator is operable to form the packet into one or more cells, the one or more cells comprising a control cell when the packet is formed into one cell, and comprising a control cell and one or more data cells when the packet is formed into more than one cell, wherein the memory allocator assigns the memory address to the control cell, and respectively assigns one or more additional memory addresses to the one or more data cells.

5. The system according to claim 4, wherein when the packet is formed as more than one cell the control cell comprises one or more pointers to respective ones of the additional memory addresses.

6. The system according to claim 4, wherein when the packet is formed as more than one cell the cache memory allocator is operable to receive the one or more additional memory addresses and associate the one or more additional memory addresses with respective one or more additional cache memory addresses.

7. The system according to claim 6, wherein the hash table is operable to store the additional memory addresses and the additional cache memory addresses, with the additional memory addresses as keys and the additional cache memory addresses as respective values.

8. The system according to claim 6, wherein the cache memory is operable to store a portion of the packet at the location indicated by the cache memory address, and to store respective other portions of the packet at respective locations indicated by the additional cache memory addresses.

9. The system according to claim 1, wherein the eviction engine comprises a memory for storing a priority for each packet stored in the cache memory.

10. The system according to claim 1, wherein the system is an integral part of an integrated circuit.

11. The system according to claim 10, wherein the integrated circuit is an application-specific integrated circuit (ASIC).

12. The system according to claim 10, wherein the cache memory is an integral part of the integrated circuit, and the non-cache memory is external to the integrated circuit.

13. The system according to claim 12, wherein the cache memory is a static random-access memory (SRAM), and the non-cache memory is a dynamic random-access memory (DRAM).

14. A method for storing packets in memory and reading the packets from memory, comprising:
    allocating a memory address, corresponding to a non-cache memory, to a packet;
    associating the memory address with a cache memory address;
    storing the memory address and the cache memory address in a hash table, with the memory address as a key and the cache memory address as a value;
    storing the packet in cache memory at a location indicated by the cache memory address;
    when occupancy of the cache memory is high, determining one or more cached packets to remove from the cache memory and place in the non-cache memory;
    receiving a read request comprising a read address corresponding to the non-cache memory and allocated to a desired packet to be read from either the cache memory or the non-cache memory; and
    storing the desired packet, upon reading from either the cache memory or the non-cache memory, into a reorder buffer such that the desired packet is supplied in response to the read request at a timing proper relative to a timing of other read requests.

15. The method according to claim 14, further comprising, upon receiving the read request, assigning a continuous space in the reorder buffer for accommodating the desired packet.

16. The method according to claim 14, wherein the step of allocating the memory address comprises:
    forming the packet into one or more cells, the one or more cells comprising a control cell when the packet is formed into one cell, and comprising a control cell and one or more data cells when the packet is formed into more than one cell; and
    allocating the memory address to the control cell, and respectively allocating one or more additional memory addresses to the one or more data cells.

17. The method according to claim 16 wherein when the packet is formed as more than one cell the control cell comprises one or more pointers to respective ones of the additional memory addresses.

18. The method according to claim 16, wherein when the packet is formed as more than one cell the method further comprises associating the one or more additional memory addresses with respective one or more additional cache memory addresses.

19. The method according to claim 18, wherein the step of storing the memory address and the cache memory address in the hash table further comprises storing the additional memory addresses and the additional cache memory addresses in the hash table, with the additional memory addresses as keys and the additional cache memory addresses as respective values.

20. The method according to claim 19, wherein the step of storing the packet in cache memory at a location comprises storing a portion of the packet at the location indicated by the cache memory address, and storing respective other portions of the packet at respective locations indicated by the additional cache memory addresses.

* * * * *